(12) United States Patent
Ayliffe

(10) Patent No.: US 7,653,274 B2
(45) Date of Patent: Jan. 26, 2010

(54) OPTOELECTRIC SUBASSEMBLY

(75) Inventor: Michael H. Ayliffe, San Jose, CA (US)

(73) Assignee: Oclaro Technology PLC, Towcester Northamptonshire (GB)

( * ) Notice: Subject to any disclaimer, the term of this patent is extended or adjusted under 35 U.S.C. 154(b) by 876 days.

(21) Appl. No.: 10/985,166

(22) Filed: Nov. 10, 2004

(65) Prior Publication Data
US 2005/0123237 A1    Jun. 9, 2005

Related U.S. Application Data

(60) Provisional application No. 60/519,026, filed on Nov. 10, 2003.

(51) Int. Cl.
  *G02B 6/32* (2006.01)
  *G02B 6/36* (2006.01)
(52) U.S. Cl. .......................................... 385/33; 385/93
(58) Field of Classification Search .................. 385/33, 385/93
  See application file for complete search history.

(56) References Cited

U.S. PATENT DOCUMENTS

| | | | | |
|---|---|---|---|---|
| 4,723,257 A * | 2/1988 | Baer et al. | ................... | 372/108 |
| 4,732,450 A * | 3/1988 | Lee | .............. | 385/33 |
| 5,175,783 A * | 12/1992 | Tatoh | .......................... | 385/93 |
| 5,463,707 A * | 10/1995 | Nakata et al. | ................. | 385/35 |
| 5,611,006 A * | 3/1997 | Tabuchi | ........................ | 385/14 |
| 5,666,450 A * | 9/1997 | Fujimura et al. | .............. | 385/93 |
| 6,522,827 B1 * | 2/2003 | Loeb et al. | ................... | 385/147 |
| 6,568,864 B1 * | 5/2003 | Ishimaru | ....................... | 385/93 |
| 6,820,445 B2 * | 11/2004 | Gratrix | ......................... | 65/387 |
| 6,862,383 B2 * | 3/2005 | Kikuchi et al. | ................. | 385/33 |
| 2002/0186742 A1* | 12/2002 | Flint et al. | .................... | 372/70 |
| 2003/0123805 A1* | 7/2003 | Akashi et al. | ................. | 385/49 |
| 2005/0025420 A1* | 2/2005 | Farr | ............................ | 385/33 |

OTHER PUBLICATIONS

JP 2-110425, Kiyonon et al., Apr. 23, 1990, G02B027/28.*

* cited by examiner

*Primary Examiner*—K. Cyrus Kianni
(74) *Attorney, Agent, or Firm*—Parsons & Goltry; Robert A. Parsons; Michael W. Goltry

(57) ABSTRACT

An optoelectric subassembly including a receptacle assembly with an optoelectric device mounted therein to define a light axis. The receptacle assembly includes an optical fiber mounting structure defining an opening with an end of an optical fiber received therein. The mounting structure and opening are designed to position the received optical fiber with an end facet substantially perpendicular to the light axis. A first lens is mounted in the receptacle assembly adjacent the optoelectronic device in the light axis and a ball lens is mounted in the receptacle assembly and positioned in the light axis. The ball lens is mounted so as to be in abutting engagement with the facet of an optical fiber inserted into the opening. By forming the ball lens with a diameter equal to the diameter of a mounting ferrule on the end of the fiber and also equal to the diameter of the ferrule receiving opening, the ball lens is self-aligning.

2 Claims, 2 Drawing Sheets

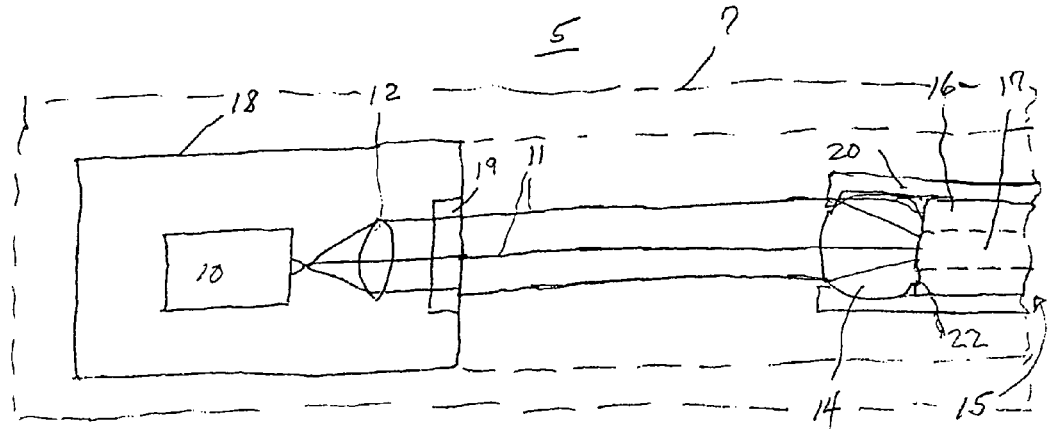
FIG. 1
FIG. 2
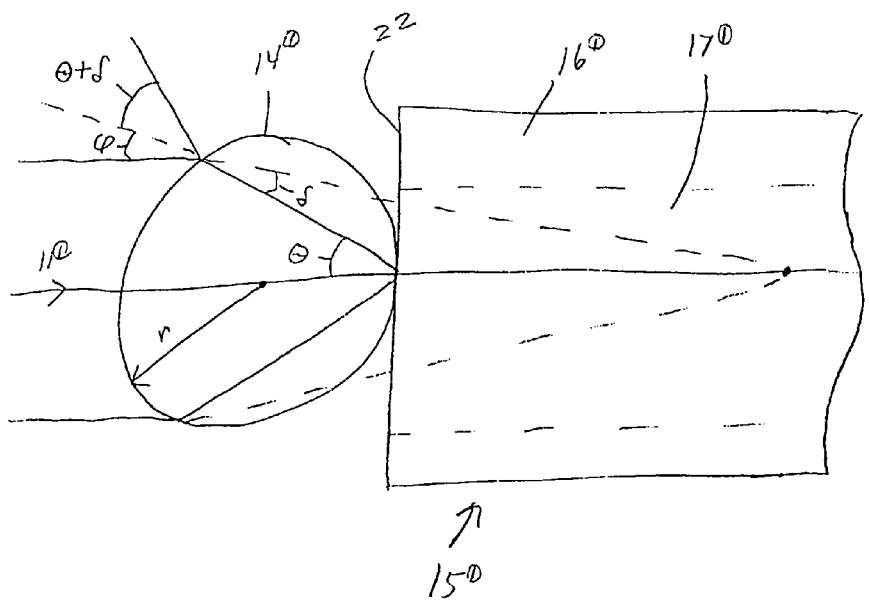

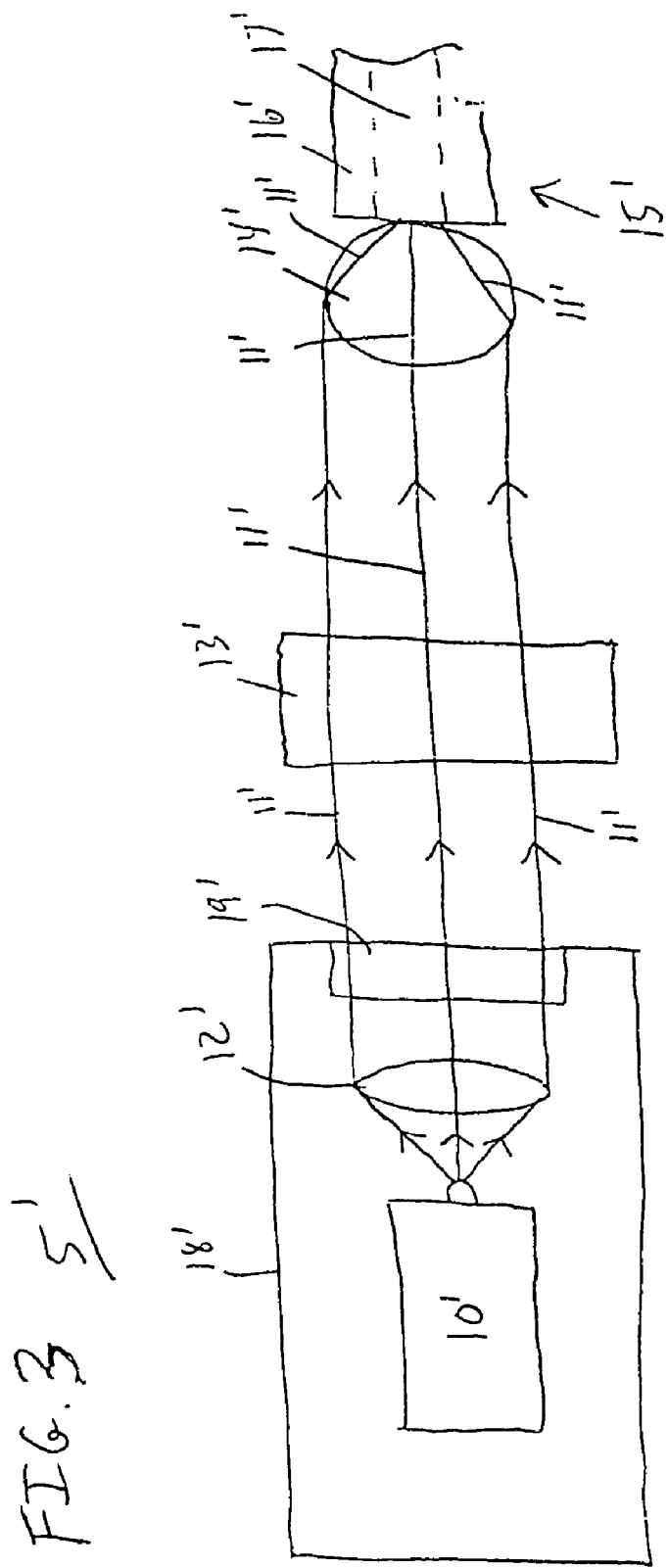

OPTOELECTRIC SUBASSEMBLY

CROSS-REFERENCE TO RELATED APPLICATIONS

This application claims the benefit of U.S. Provisional Application No. 60/519,026, filed 10 Nov. 2003.

FIELD OF THE INVENTION

This invention relates to optoelectronic modules and, more particularly, to the optical components included in such modules.

BACKGROUND OF THE INVENTION

In optoelectronic modules used in the various communications fields, one of the most difficult problems that must be solved is the efficient transmission of light between a light generating device and an optical fiber or, alternatively, the transmission of light from the optical fiber to a light receiving device. Here it will be understood by those skilled in the art that the term "light" is a generic term which includes any electromagnetic radiation that can be modulated and transmitted by optical fibers or other optical transmission lines. Because optical fibers and the active regions of light generating devices and light receiving devices are very small, alignment of an optical fiber with a light generating device or a light receiving device is difficult and can be very work intensive and time consuming.

For example, one method used to align an optical fiber with a light generating device or a light receiving device is called active alignment. In this process a light is introduced at one end of the optical fiber and the other end is moved adjacent the active area of an operative light receiving device, while monitoring the output of the light receiving device, until a maximum output signal is received. Alternatively, an operative light receiving device is attached to one end of an optical fiber and the other end is moved adjacent the active area of an operative light generating device until a maximum output signal is received. In both instances the amount of time and effort required to obtain the optimum alignment is extensive.

In some systems, generated light passes directly into an optical fiber and exits the optical fiber where the light is directed onto an active surface of a light receiving device. However, in the real world much of the generated light travels outwardly in a direction to miss the optical fiber and some of the light impinging on the optical fiber is reflected back into the light generating device. Much of the cause of this outwardly or misdirected light comes from poor alignment along the Z axis (the axis of light propagation) as well as misalignment in the X and Y axes (defining a plane perpendicular to the direction of light propagation). The outwardly or misdirected light can impinge on adjacent devices to produce unwanted cross-talk within the system.

The reflected light can be directed back into the light generating device or the optical fiber can interfere with generated light to produce unwanted and troublesome modes or frequencies. Also, the loss of light through misdirection and/or reflection means that additional power must be used to produce sufficient light to transmit between various devices, thus increasing power dissipation.

The vast majority of optoelectric device-to-optical fiber use either one lens (a focusing lens) or two lenses (one lens to collimate and one lens to focus). Each of these approaches have pros and cons when it comes to optical alignment tolerances. The one-lens design has tight lateral (x and y directions) tolerances but loose tilt tolerances. The two-lens design is the opposite, i.e. loose lateral tolerances but tight tilt tolerances. Therefore, neither of these designs overcomes the alignment and, thus, the assembly problems that cause a large amount of the failures and the cost of the product.

Also, in optoelectronic modules it is usual to require that the return loss measured into the transmitter optical subassembly (TOSA) be 27 dB minimum. Conventionally, to reduce light reflection back into the laser or other optoelectric device, the adjacent facet of the optical fiber is angled relative to the optical axis (Z-axis). The angled facet forces the focusing optics to be tilted relative to the core of the optical fiber. This tilting adds further complications to the original design and the assembly of the optoelectronic module.

It would be highly advantageous, therefore, to remedy the foregoing and other deficiencies inherent in the prior art.

Accordingly, it is an object the present invention to provide a new and improved optoelectric subassembly for an optoelectronic module.

Another object of the present invention is to provide a new and improved optoelectric subassembly with lower lateral and tilt tolerances that can be easily manufactured and assembled.

Another object of the present invention is to provide a new and improved optoelectric subassembly with high optical return loss (i.e. low reflection into the optoelectric device).

Another object of the present invention is to provide a new and improved optoelectric subassembly for an optoelectronic module which greatly increases the life and reliability of the mechanism and the optoelectronic module.

SUMMARY OF THE INVENTION

Briefly, to achieve the desired objects of the instant invention in accordance with a preferred embodiment thereof, an optoelectric subassembly includes an optoelectric device defining a light axis and an optical fiber mounting structure defining an opening for receiving an optical fiber having an end with a facet. The mounting structure and opening are designed to hold the received optical fiber with the facet substantially perpendicular to the light axis. A first lens is mounted adjacent to the optoelectronic device in the light axis and a ball lens is positioned in the light axis and mounted to be in abutting engagement with the facet of the optical fiber when the optical fiber is received in the opening of the mounting structure.

In a specific embodiment, an optoelectric subassembly includes a receptacle assembly with an optoelectric device mounted therein to define a light axis. The receptacle assembly includes an optical fiber mounting structure defining an opening with an end of an optical fiber received therein. The mounting structure and opening are designed to position the received optical fiber with an end facet substantially perpendicular to the light axis. A first lens is mounted in the receptacle assembly adjacent the optoelectronic device in the light axis and a ball lens is mounted in the receptacle assembly and positioned in the light axis. The ball lens is mounted so as to be in abutting engagement with the facet of an optical fiber inserted into the opening.

In the above embodiment, by forming the ball lens with a diameter equal to the diameter of a mounting ferrule on the end of the fiber and also equal to the diameter of the ferrule receiving opening, the ball lens is self-aligning. Further, assembly is substantially simplified since the ball lens is simply inserted into the opening before the ferrule encased fiber is inserted. This insertion step can be accomplished through a side hole in communication with the ferrule receiving opening.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 1 is a simplified sectional view of an optoelectronic module in accordance wiith the present invention;

FIG. 2 is an enlarged sectional view of a portion of the optoelectronic module of FIG. 1; and FIG. 3 is a simplified sectional view of another embodiment of an optoelectronic module in accordance with the present invention.

DETAILED DESCRIPTION OF DRAWINGS

Turning now to FIG. 1, an optoelectronic module 5 is illustrated. The various figures illustrated and discussed hereafter are simplified views of the embodiments for ease of understanding. Optoelectronic module 5 includes a housing 18, which may be an integral portion of module 5, with a window 19. Optoelectronic module 5 is typically formed to fit inside a receptacle assembly 7 (illustrated in broken lines for simplicity) which also holds an optical fiber 15 to provide optical alignment. An optoelectric device, which in this explanation is a laser 10, is positioned within housing 18 so as to emit light 11 that is coupled into an accessible facet 22 of optical fiber 15. Housing 18 can include, for example, an elongated cylindrical ferrule, a TO cap, or the like, and can be hermetically sealed if desired. It will be understood that window 19 includes a material transparent to the wavelengths of interest, such as BK7 glass. It is well known by those skilled in the art that BK7 glass is a borosilicate crown optical glass with high homogeneity and low bubble and inclusion content widely used in the visible and near IR ranges and is commercially available from a variety of manufacturers.

It will also be understood that laser 10 can be a semiconductor laser (i.e. VCSEL, edge-emitting laser, etc.) mounted on a heatsink (not shown) or a similar supporting structure so as to direct emitted light 11 along an optical axis aligned with optical fiber 15. Further, light 11 typically has a wavelength of 1310 nm or 1550 nm which are wavelengths used in optical fiber communication systems. However, other wavelengths may be used depending on the application and the specific operating frequency in no way limits the scope of the invention.

In the preferred embodiment, fiber 15 is a single mode fiber with a cladding layer 16 and a glass core 17. However, it will be understood that fiber 15 can be a multimode fiber or a waveguide structure and the illustration of a single mode fiber in the preferred embodiment is for illustrative purposes only. Also, while laser 10 is used as the optoelectric device for purposes of explanation, it will be understood that devices for converting light to electrical signals, such as photodiodes and the like, can also be applied to this invention.

One of the major purposes of the present invention is to relax the alignment tolerances of optically coupling light 11 between the optoelectric device (laser 10) and facet 22 of fiber 15. The lateral alignment tolerance of the optical fiber is determined by the size of the fiber core. For a standard singlemode optical fiber such as Corning SMF28, the core diameter is 9 um and a lateral misalignment error of 1.6 microns will decrease coupling efficiency by 0.5 dB, while the tolerance of the fiber to tilt misalignment is 1.9 degrees. While it is relatively easy to control fiber orientation to within 1.9 degrees, it is significantly more difficult to control its lateral position to within 1.6 microns. It is a purpose of the present invention to design an optical system that provides a better balance between lateral and tilt tolerances (i.e. both the lateral tolerance and the tilt tolerance are relaxed).

In the preferred embodiment, light 11 is coupled into fiber 15 using one lens 12 positioned within housing 18, and another lens 14 as illustrated. It will be understood that in some embodiments, lens 12 may be formed as a portion of housing 18, for example, integral with window 19 or as a portion of a redirecting component (e.g. a ninety degree redirecting lens block). In the preferred embodiment, lens 12 includes an aspherical lens, such as a Geltech 370631 lens. However, it will be understood that other aspherical lenses could be used. Lens 14 includes a ball lens (hereinafter ball lens 14) and preferrably a glass ball lens that is index matched to fiber 15 to minimize optical return loss.

In this specific embodiment, laser 10 is positioned approximately 0.24 mm from lens 12. Further, lens 12 is approximately 0.35 mm thick and in this embodiment is positioned approximately 0.32 mm from window 19. Also in this embodiment, window 19 is approximately 0.25 mm thick. It will be understood, however, that these distances and thicknesses are used for illustrative purposes only and in no way limit the scope of the invention. Further, in the preferred embodiment, ball lens 14 is positioned in physical contact with optical fiber 15 in order to maximize optical return loss, i.e. reflection back into laser 10. Return loss above 30 dB has been achieved using the described embodiment.

In this preferred embodiment, receptacle assembly 7 is constructed with opening 20 designed to receive ball lens 14 therein and hold it immovably in place and in abutting engagement with facet 22 of optical fiber 15. By forming receptacle assembly 7 in this fashion, assembly of the components during manufacturing is substantially simplified. Ball lens 14 may be simply dropped into opening 20, or it may be press-fit or otherwise inserted into the final position. Further, if desired ball lens 14 can be glued to the fiber facet using an index-matching adhesive.

Module 5 has several advantages. One advantage is that ball lens 14 currently costs approximately $0.30 compared to $5-$10 or more for an aspherical lens as generally included in a two-lens module. Further, fiber 15 is less expensive because facet 22 can be cut or cleaved perpendicular to the length and a complicated angled facet is not required. Further, because an angled facet is not used, the orientation of the angled fiber facet does not have to be keyed to a receptacle assembly (not shown) but can simply be inserted into an opening in receptacle assembly 7 designed for that purpose. The embodiment illustrated provides high return loss (e.g. above 30 dB) while keeping the optical train straight on-axis which further facilitates construction and assembly. Also, because the focusing optics do not need to be tilted relative to the core of the optical fiber, module 5 can be made very compact (e.g. 3.6 mm to 3.8 mm in length) and, consequently, is much easier to mount in a small form factor transceiver.

Turn now to FIG. 2, which illustrates an enlarged view of ball lens 14 and optical fiber 15 included to better illustrate another advantage of module 5. By using ball lens 14 in module 5, the alignment tolerances of the optical components (e.g. lens 12, ball lens 14, etc.) are significantly relaxed. Ball lens 14 creates an image of a virtual fiber, as shown in FIG. 2.

In FIG. 2, one can show that $\phi \cong \theta \cdot (2-n)$ using the small angle approximation wherein n is the index of refraction of the material included in ball lens 14. Since $NA_{Fiber}=n \cdot \sin(\theta)$, one can also show that $$NA_{Virtual\,Fiber} = NA_{Fiber} \cdot \left(\frac{2}{n} - 1\right),$$

wherein $NA_{Fiber}$ is the numerical aperature of the fiber and $NA_{Virtual\,Fiber}$ is the numerical aperture of the virtual fiber. It should be noted that the magnification factor of ball lens 14 is independent of radius, r, of ball lens 14. This implies that any size ball lens could be used in module 5. A convenient radius, r, for ball lens 14 is approximately 1.25 mm, which would enable ball lens 14 to fit into the same size receptacle assembly, e.g. opening 20, as optical fiber 15. Generally, the end of optical fiber 15 is enclosed in a ferrule (not shown) for convenience in plugging and unplugging the fiber into optoelectronic modules. The ferrules normally used have an outside diameter of approximately 1.25 mm. Hence, a 1.25 mm ball lens positioned in an approximately 1.25 mm opening in abutting engagement with an optical fiber encased in a 1.25 mm ferrule would be self-aligned with the fiber.

In module 5 and as illustrated in FIG. 2, abutting the index-matched ball lens to fiber facet 22 increases the lateral alignment tolerance by a factor of $$\frac{n}{2-n}.$$

Because core 17 of fiber 15 is made of silica, optimal index matching is achieved using a silica ball lens (refractive index, n=1.447 at 1310 nm). Hence, if a silica ball lens 14 is used, then the lateral alignment tolerance improves by a factor of approximately 2.8. If ball lens 14 includes BK7 glass (n=1.504 at 1310 nm), then the alignment tolerance improves by a factor of approximately 3.0. For a BK7 glass ball, the optical return loss will still be greater than approximately 27 dB.

Relaxing the lateral alignment tolerances results in tighter tilt tolerances, in approximately the same proportions (i.e. tilt tolerances are tightened by a factor of approximately 3.0). Optical simulations of a 1.5 mm diameter silica ball attached to a singlemode fiber facet results in a lateral tolerance=±3.9 microns and tilt tolerance=±0.7 degrees for a 0.5 dB drop in coupling. These results are to be compared with sets of tolerances for the fiber without the ball lens (i.e. with an aspherical lens in place of the ball lens), which tolerances are ±1.6 microns and ±1.9 degrees, respectively. Controlling position to ±3.9 microns is much easier and can be achieved manually using low-cost alignment stages.

Turn now to FIG. 3, which illustrates an optoelectric module 5' in accordance with the present invention. In this embodiment similar elements are numbered the same with a prime added to differentiate the different embodiment. Module 5' is typically formed to fit inside a receptacle assembly (not shown) which also holds an optical fiber 15'. In a preferred embodiment, module 5' includes a housing 18' with a window 19'. Module 5' also includes a laser 10' positioned within housing 18' wherein laser 10' emits light 11' which is to be coupled into optical fiber 15'. Housing 18' can include, for example, an elongated cylindrical ferrule, a TO cap, or the like, and can be hermetically sealed if desired. It will be understood that window 19' can include a material transparent to the wavelengths of interest, such as BK7 glass.

It will also be understood that laser 10' can be a semiconductor laser (i.e. VCSEL, edge-emitting laser, etc.) mounted on a heatsink (not shown) or a similar supporting structure. It will be understood that laser 15' is similar to laser 15 discussed above. It will be understood that light 11' is similar to light 11 discussed above. Also, while laser 10' is used as the optoelectric device for purposes of explanation, it will be understood that devices for converting light to electrical signals, such as photodiodes and the like, can also be applied to this embodiment.

In this embodiment, fiber 15' is a single mode fiber with a cladding layer 16' and a glass core 17'. However, it will be understood that fiber 15' can be a multimode fiber or a waveguide structure and the illustration of a single mode fiber in the preferred embodiment is for illustrative purposes only. In this embodiment, an optical isolator 13' is included and positioned to further minimize backreflections of light 11' into laser 10'. In general, optical isolator 13' can be one of two types, a retarder type such as a quarter-wave plate and a Faraday type which is a combination of a polarizer and a garnet. Further, it will be understood that optical isolator 13' can be a single stage or a multi-stage isolator. While optical isolator 13' further minimizes backreflections of light 11' into laser 10', it will be understood that it is optional and may be elliminated in specific embodiments.

In the preferred embodiment, light 11' is coupled into fiber 15' using a lens 12' positioned within housing 18', and a ball lens 14' as illustrated. It will be understood that in some embodiments, lens 12' may be formed as a portion of housing 18', for example, integral with window 19' or as a portion of a redirecting component (e.g. a ninety degree redirecting lens block). In any case it is preferred that lens 12' is an aspherical lens and lens 14' is a ball lens to provide the advantages described above.

Thus, an optoelectric module with an improved set of alignment tolerances has been disclosed. In the preferred embodiment, the alignment tolerance can be increased by a factor at least 2.8 and will depend substantially on the index of refraction of the ball lens material. The index matching of the ball to the fiber ensures high optical return loss (>30 dB). Also, the optoelectric module uses less expensive components and is easier to manufacture. Thus, a new and improved optoelectronic module is disclosed with the following list specifying at least some of the advantages: better distribution between lateral and tilt alignment tolerances; low-cost manual align stations can be used in assembly; only the first lens (i.e. the aspherical lens) requires alignment because the ball lens can be self-aligning; high coupling efficiency; low backreflection from the fiber facet; high return loss (>40 dB) measured into the Tx module; and on-axis optical train allowing easier mounting in a small form factor transceiver.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:
1. An optoelectric subassembly comprising:
an optoelectric device defining a light axis;

an optical fiber mounting structure defining an opening for receiving an optical fiber having an end with a facet, the mounting structure and opening being designed to hold the received optical fiber with the facet substantially perpendicular to the light axis;

a first lens mounted adjacent the optoelectronic device in the light axis; and a ball lens positioned in the light axis and mounted to be in abutting engagement with the facet of the optical fiber when the optical fiber is received in the opening of the mounting structure, the ball lens is index matched to a core of the optical fiber.

2. An optoelectric subassembly as claimed in claim 1 wherein the ball lens includes one of a silica ball and a BK7 glass ball.

* * * * *